Oct. 17, 1939.   T. M. BRUECK   2,176,621
SHUTTER MECHANISM FOR POCKET CAMERAS
Filed Aug. 1, 1938   2 Sheets-Sheet 1
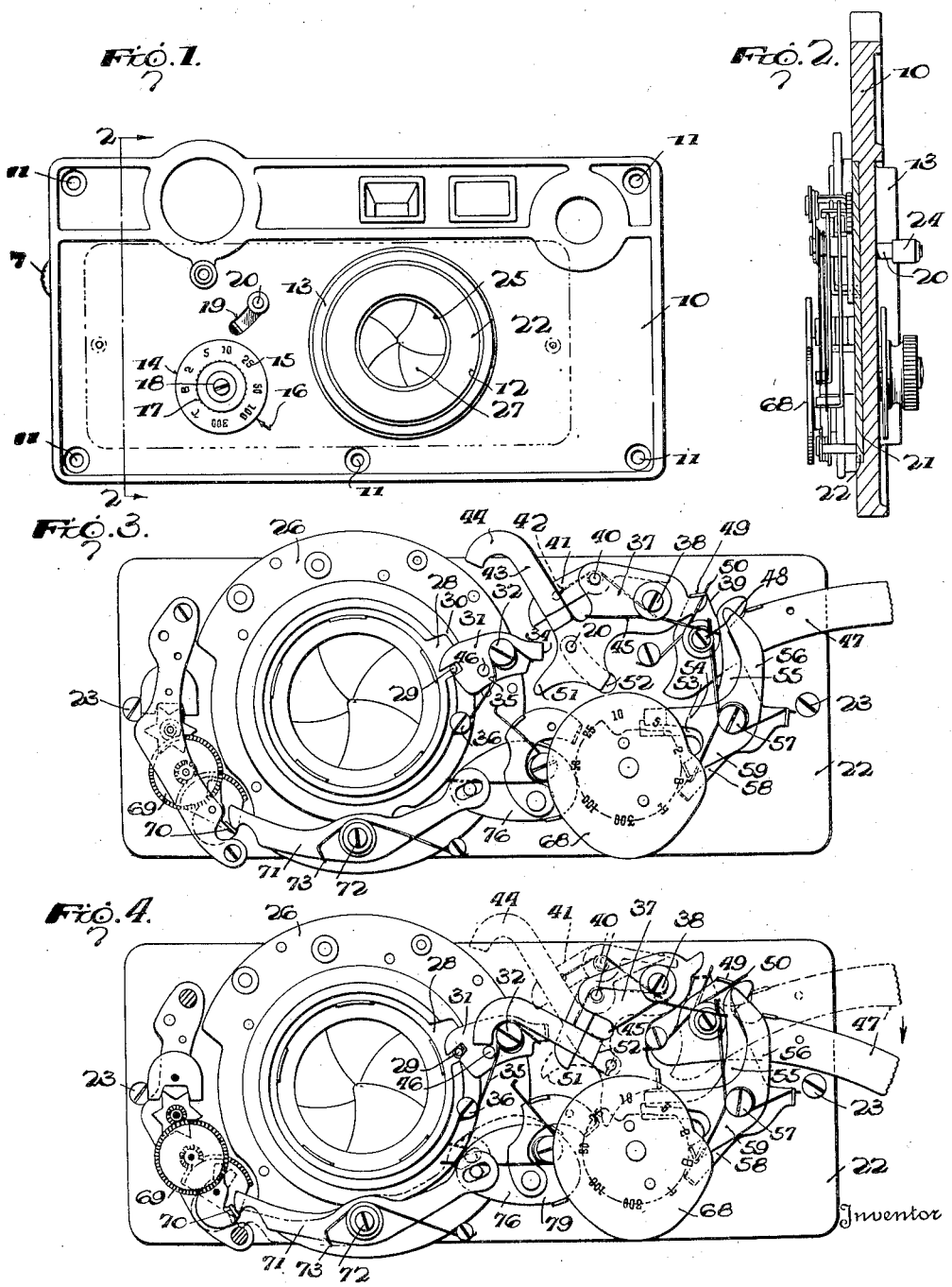
Theodore M. Brueck
Inventor
By
Attorney Patented Oct. 17, 1939

2,176,621

UNITED STATES PATENT OFFICE 2,176,621

SHUTTER MECHANISM FOR POCKET CAMERAS

Theodore M. Brueck, Rochester, N. Y., assignor to Ilex Optical Company, Rochester, N. Y., a corporation of New York Application August 1, 1938, Serial No. 222,523

4 Claims. (Cl. 95—63)

The present invention relates generally to shutter mechanisms for cameras and more particularly to a shutter mechanism having for the primary object the convenient and effective adaptation of an efficient form of shutter with a wide range of adjustment to durable service with the type of non-folding pocket cameras now quite commonly in use.

It is a well-known fact that with that type of nonfolding pocket cameras, probably better known as candid cameras, in wide use at present time, all parts are necessarily condensed to occupy minimum space, especially from front to rear or, in other words, through the depth of the camera. As far as the shutter mechanism of such cameras is concerned and while considerable space is available lengthwise of the camera case, the available space in the depth of the case, or from front to rear, is very limited, and hence it is an important object of the invention to provide a shutter mechanism which will be strong, durable and efficient and at the same time will require but minimum space from front to rear of the camera case for its complete housing and support.

It is also well known that cameras of the above general type are most commonly equipped with front or face plates detachably secured to the fronts of the camera cases, the latter having shallow concavities at the rear of the front or face plates, in which the shutter mechanism must be adapted to housing and operation. It is therefore another object of the invention to provide a shutter mechanism which may be readily and quickly assembled on a supporting plate adapted for detachable connection with the rear face of the front or face plate of such a camera, in a manner which permits the several parts to be freely and efficiently operable within the forward concavity of the camera case, as well as to ready removal whereby the entire mechanism is easily accessible for quick repair and substitution of parts whenever necessary.

It is further well known that with the speed films now in common use, it is essential in the taking of pictures of objects in movement that the shutter mechanism provide for high speed operation under proper conditions in connection with instantaneous exposures, while retaining, of course, the desirable bulb and time operations of the shutter, where, for any reason, it is desirable that more than usual delay in shutter closing becomes necessary. It is a still further object of the invention to provide a shutter mechanism having all of these desirable features and embodying a convenient and accurate arrangement and operation of parts insuring a gradual range of adjustment, in connection with instantaneous exposures, between the highest and lowest speeds.

With the above general objects in mind, other and more specific objects of the present invention, as well as the resulting advantages thereof, will clearly appear in the course of the following description in detail of the several parts of the apparatus involved in the best mode so far devised for carrying the invention into practical effect. In this description, reference is made to the accompanying drawings, which illustrate the invention and form a part of this specification, and in which:

Figure 1 is a front elevation of the front plate of a camera of the type to which my invention is applied.

Figure 2 is an enlarged vertical cross section taken substantially on line 2—2 of Figure 1, showing my improved shutter mechanism in its attached position at the rear of the front plate.

Figure 3 is an elevation taken on an enlarged scale, looking at the machinism of my invention from its inner or rear face, and showing the parts in the set position ready for the making of an instantaneous exposure, the mechanism and its supporting plate being detached from the camera front plate.

Figure 4 is a similar view showing the parts in released position after the exposure has been made.

Figure 5:
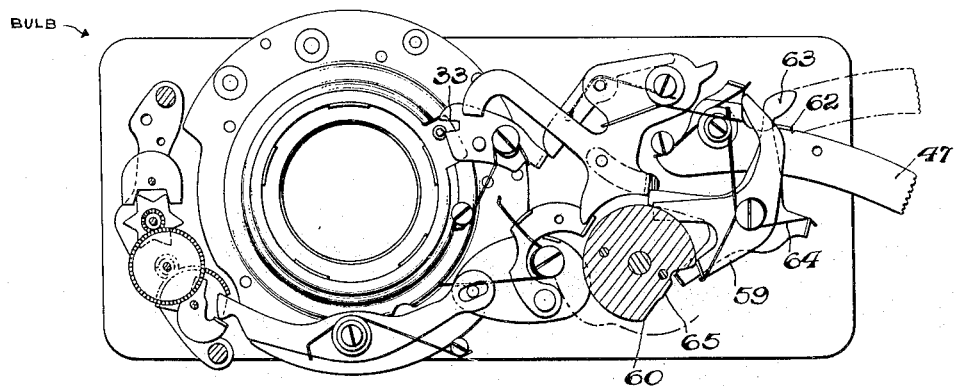
Figure 5 is another similar view, certain parts being broken away, showing the parts positioned as in the taking of a bulb picture.

Referring now to these figures and particularly to Figure 1, I have shown and generally indicated at 10 the front plate of a camera, having a series of screw apertures 11 by means of which it is ordinarily attached to a camera case, and having a somewhat centrally located exposure opening 12 around which is a short forwardly projecting annular flange 13, also shown in Figure 2, threaded for the reception of a lens and diaphragm assembly, which has not been shown in this instance in view of the fact that it forms no part of the present invention.

At the left of the exposure opening 12 is a rotatable dial 14 preferably having an annular series of graduations 15 corresponding to various speeds of shutter movement in the making of instantaneous exposures as well as to bulb and time exposures. These graduations are arranged to cooperate with a stationary index member 16 stationarily disposed on the front plate, and the dial 14 is preferably provided with a central forwardly projecting peripherally knurled finger piece 17, whereby to facilitate manual rotation of the dial and its shaft to which the dial is detachably connected by an axial screw 18. This dial controls, through rotation of its shaft, the shutter mechanism of the present invention, and for this purpose the dial shaft, of course, extends rearwardly through the front plate 10 in a manner which will be more particularly referred to hereinafter.

In addition to the dial 14, the present invention contemplates that the front plate 10 of the camera shall have above the dial member a short arcuate slot 19 in which the setting finger piece or pin 20 works. This finger piece projects at its forward end beyond the forward surface of the front plate 10, as will be seen in Figure 2, and, as shown in Figure 1 at the upper end of the arcuate slot 19, corresponds to the set position of the mechanism. During each complete shutter actuation, the finger piece 20 swings downwardly within slot 19 to the lower end of the latter.

The front plate 10 is provided in its rear face as seen in Figure 2, with a shallow rectangular depression 21, the full extent of which is indicated in dotted lines in Figure 1, to receive a similarly rectangular supporting plate 22 on which my improved shutter mechanism is assembled for bodily attachment to and detachment from the front plate.

For the above reason, the supporting plate 22 of the shutter mechanism as seen in Figures 3 to 7, inclusive, is provided with end apertures for the reception of screws 23, by means of which it is normally held in connection with the front plate 10. In furtherance of this bodily attachment and detachment of the shutter mechanism, the setting finger piece 20 is provided with a detachable forward head 24 permitting the pin 20 to be projected forwardly and withdrawn rearwardly through the front plate slot 19. The dial 14 is assembled on its shaft and normally held, as before stated, by screw 18, removal of which permits the dial to be slipped forwardly off of the shaft so that the latter is thus projectable forwardly and withdrawable rearwardly through its respective opening of the front plate 10.

The supporting plate 22 of the shutter mechanism has an exposure opening 25, which in the assembled position is in axial alignment with the opening 12 of the front plate. Upon the rear face of the supporting plate 22 is secured the circular frame 26 of an iris type of diaphragm, the several leaves 27 of which overlap in the closed position in the usual manner, and the circumferentially shiftable actuating ring 28 of which, whose circumferential movements serve in the usual manner to open and close the iris leaves 27 between the positions respectively shown in Figures 5 and 3, for instance, is in the present instance provided with a projecting rigid pin 29. The movements of this pin 29 in a cut out portion 30 of the diaphragm frame bring about the full operative stroke of the diaphragm opening and closing ring 28, the latter of which is shiftable clockwise by downward movement of pin 29 to close the shutter and counterclockwise by upward movement of pin 29 to open the shutters, as will be plain by a comparison of Figures 5 and 3 above referred to.

Figure 7:
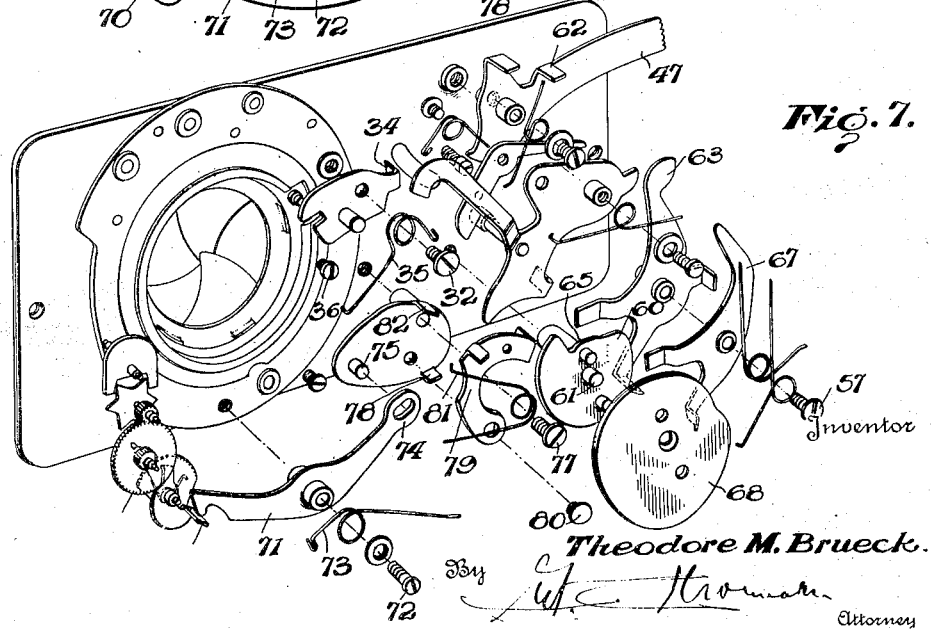
Figure 7 is a perspective view of the supporting plate and the several parts of the improved shutter mechanism exploded in relation to said supporting plate.

On the frame 26 of the diaphragm, the latter of which is rigidly attached to the supporting plate 22 so as to center the diaphragm leaves 27 with respect to the exposure opening 25, a diaphragm shifting lever 31 is pivoted intermediate its ends upon a pivot screw 32, one end of said lever having an open slot 33 in which pin 29 is received, and the other end having an angular engaging end 34 turned toward the rear surface of the supporting plate 22, as plainly seen in Figure 7. The last-mentioned end of lever 31 is engaged by one angularly bent end of its controlling spring 35, this spring having an intermediate coil loosely surrounding the pivot screw 32 and having its opposite angular end engaging a stationary stud 36 on the shutter frame. This spring functions to hold the inner slotted pin engaging end of the lever 31 in the downward position of the parts, maintaining the diaphragm leaves 27 in closed position during the setting movement of the actuating parts to be presently described.

The master lever of the present mechanism is shown at 37, being pivoted on the supporting plate 22 above the center thereof and at one side of the shutter frame upon a pivot screw 38 which, it will be noted, is nearer to the outwardly projecting end of said lever than it is to the inwardly projecting portion thereof with respect to the shutter actuating lever 31.

The outwardly projecting relatively short end of the master lever 37 has a reduced latch engaging nose 39, and upon the upper edge of its inwardly projecting portion there is pivoted at 40 an angular arm 41, the inner portion of which projects beyond the master lever and in the swinging movement of the latter engages at its free end with the outer angular end 34 of the shutter actuating lever 31. The opposite end of this arm 41, as shown in dotted lines in Figure 3 in particular, overlies the pivot screw 38, thus limiting movement of the arm 41 on its pivot 40 with respect to the master lever in one direction, movement of the arm in the opposite direction being controlled by a spring 42 engaged at one end with the arm and having an intermediate coil loosely around the pivot pin 40 with its opposite end extending beneath and having bearing upwardly against the pivot screw 38 of the master lever.

The inwardly projecting end portion of the master lever 37 has secured thereto the rear end of the finger setting pin 20 before referred to, and this portion of the master lever is also provided with an upwardly extending arm 43 inclined toward the shutter frame and terminating in an upper curved end 44. The master lever is thus rocked to swing its inner end portion upwardly when the mechanism is set by the manual shifting of the setting pin 20 in an upward direction in the slot 19, and in this movement the shutter opening arm 41, as well as the shutter closing arm 43, is shifted above the shutter actuating lever 31.

When the master lever is released, its movement in the opposite direction is brought about by its controlling spring 45, and in this movement its inner portion swings downwardly so that the inner end of arm 41 strikes the angular end 34 of lever 31, rocking said lever 31 clockwise to open the shutter. As the end of arm 41 wipes past the end 34 of lever 31, the upper curved end 44 of the rigid arm 43 of the master lever moves into engagement with a stud 46 projecting from lever 31 inwardly beyond its pivot screw 32, so that, in the final portion of the down swing of the master lever, the end 44 of arm 43, engaging stud 46, swings lever 31 to close the shutter.

The finger release 47, the free end of which projects beyond one end of plate 22, and in fact slightly beyond one side of the front plate 10, is pivotally supported upon a pivot screw 48 in connection with plate 22, and above this pivot screw has an angular latch piece 49. The finger release is normally held in the upper position shown in Figure 3 by means of its spring 50, and the latch piece 49 is so positioned that, in the manual setting of the master lever 37, its outwardly projecting nose 39 wipes downwardly past the latch piece 49 until the latter swings inwardly to latched position above nose 39, as seen in Figure 3, thus holding the master lever 37 in its upper position as shown in said figure. Downward movement upon the outwardly projecting end of the finger release swings the latch piece 49 outwardly and downwardly until it passes beyond the end of the nose 39 of the master lever to release the latter for the shutter opening and closing movements previously described.

It will be noted that the inner end portion of the master lever 37, that is, that portion lying between its pivot screw 38 and the shutter frame 26, has an inwardly and downwardly projecting bearing nose 51 and an outwardly facing downwardly projecting angular stop piece 52, the latter of which shifts in an outward direction away from the shutter frame when the master member swings downwardly to open and close the shutter in the manner before described. In such movement the angular stop member 52 moves in a path, into which laterally inwardly projecting stop arms 53 and 54, respectively, of the bulb and time levers 55 and 56 may be projected each arm 53, 54, when so projected into the path of movement of the stop piece 52, serving to temporarily arrest the master lever and prevent movement of its pivoted actuating arm 41 past the outer end of the pivoted actuating lever 31 of the shutter.

The two levers 55 and 56, respectively, controlling operation of the parts during bulb and time exposures, are pivoted upon the same pivot screw 57, the bulb lever 55 being positioned between the time lever 56 and the supporting plate 22, to which the pivot screw 57, like the other pivot screws, is attached. In addition to their lateral inwardly projecting stop arms 53 and 54, the bulb and time levers 55 and 56 are respectively provided with depending and inwardly inclined controlling arms 58 and 59, arm 58 of lever 55 being somewhat longer than arm 59 of lever 56. Both of these controlling arms 58 and 59 have angular extremities projecting away from the supporting plate 22 and engaging the peripheral edge of a cam 60 secured upon the rear end of the shaft 61, which latter is journaled through both the supporting plate 22 of the shutter mechanism and the front plate 10 of the camera, and carries upon its forward end the rotating dial 14 hereinbefore described. It will be noted that the peripheral edge of cam 60 is, for the major part, concentric with respect to the axis of shaft 61, and that it presents at one side a cutaway portion which, when the dial 14 is positioned to bring B opposite the index point 16, permits bulb lever 55 to swing to the position shown in Figure 5 so that its stop arm 53 moves upwardly into the path of the stop piece 52 of the master lever.

Thus when the finger release 47 is shifted downwardly to the full line position of Figure 5 and the bulb control lever 55 is permitted to swing as above, the master lever 37 may swing downwardly a sufficient distance so that through its shutter actuating arm 41 and the shutter actuating lever 31, the shutter will be opened as indicated in this figure. The master lever will, however, be prevented from a full downward stroke and its shutter actuating arm 41 will be prevented from wiping past and releasing the shutter actuating lever 31, so that the shutter will remain open until finger release 47 is released and returns to its upper position under actuation of its spring 50.

It will be noted that the finger release 47 has on its upper edge at a point spaced from its pivot screw 38 an upstanding lug 62. The bulb controlling lever 55 has an upstanding extension projecting between the lug 62 and the finger release pivot screw 48, and this extension is provided with an angular rounded head 63. When the bulb controlling lever shifts on pivot screw, as above mentioned, to the position shown in Figure 5, under tension of its spring 64, the finger release lug 62 is shifted below the upper head 63 of the bulb controlling lever 55 and, when the finger release is permitted to move upwardly, lug 62, engaging head 63, forces shifting movement of the bulb controlling lever in a reverse or counterclockwise direction as viewed in Figure 5, thus depressing its arm 53 below the angular stop member 52 of the master lever, whereby to thus free the latter for a continuance of its full stroke so that the shutter may close. As will be plainly seen from Figure 5, the cutaway portion 65 of the cam 60, while permitting the above described movements of the bulb controlling lever 55, still maintains the time controlling lever 56 inactive, since the controlling arm 59 of the latter is still in engagement with a portion of the concentric periphery of the cam.

Figure 6:
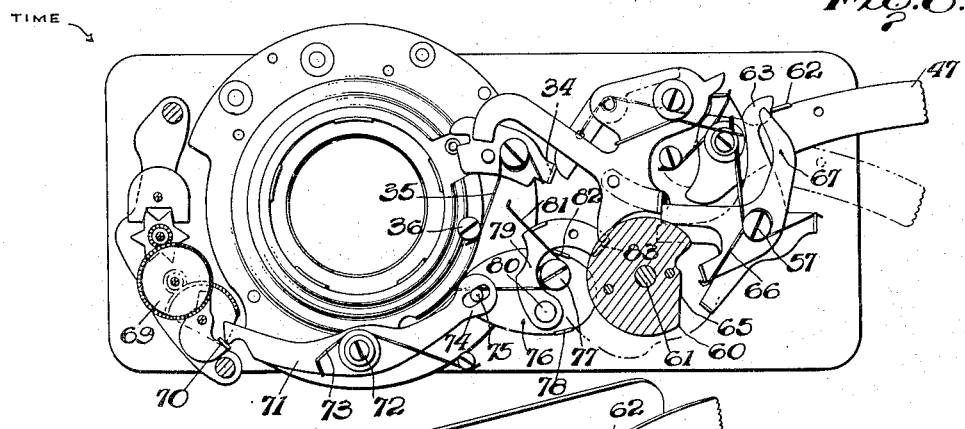
Figure 6 is still another similar view showing the parts positioned as in the taking of a time exposure.

When, however, the dial 14 is turned so that the T is opposite the index member 16, the cam 60 will be positioned as in Figure 6, in which the cut-out portion 65 thereof comes opposite to the controlling arms 58 and 59 of both the bulb and time controlling levers 55 and 56. Thus, before the finger release is initially depressed, the time controlling lever 56 will be shifted on the pivot screw 57 by its spring 66 to the position shown in Figure 6, where its stop arm 54 is raised into the path of movement of the stop arm 52 of the master lever, this stop arm 54 being, it will be noted, slightly shorter than the stop arm 53 of the bulb lever. It will also be noted that when so shifted, the upwardly projecting slightly angular extension 67 of the time controlling arm will be moved against the lug 62 of the finger release. It is, of course, understood that at the same time the bulb lever 55 is also free to move in the same manner in which it moves in the taking of a bulb picture as previously described in connection with Figure 5. During the first downward stroke of the finger release in the taking of a time exposure, the bulb controlling lever is permitted to swing to interpose its arm 53 in the path of movement of the stop member of the master lever 37, lug 62, in its downward movement, gradually shifting the time controlling lever 56 in a counterclockwise direction on its pivot screw 57 by reason of its engagement with the angular upward extension 67 of this lever until, at the lower position of its first stroke, the master lever is arrested by the bulb lever 55. However, when the finger release is permitted to move upwardly from this latter position of the parts shown in Figure 6, and before its lug 62 has engaged the head 63 of the bulb lever to release the latter from the stop arm of the master lever, the lug 62, passing upwardly along the upward extension 67 of the time controlling lever, permits this time controlling lever to again swing in a clockwise direction and interpose its arm 54 in the path of the master lever stop arm, so that it is in position to oppose completion of the stroke of the master lever just prior to the release of the latter by the bulb lever. At this point the master lever advances in its operative movement very slightly, a distance corresponding to the distance between the lengths of the arms 53 and 54 of the bulb and time levers, of which the latter is still interposed in position to check completion of the stroke of the master lever. It is required, therefore, that the finger release 47 be again depressed, and during this second depression thereof the lug 62 of the finger release, engaging the extension 62 of the time controlling lever, rocks the latter again in a counterclockwise direction so as to depress its arm 54 free of the stop piece 52 of the master lever, so that the latter may complete its effective stroke and close the shutter which was opened during the first-mentioned downward stroke of the finger release. It is true that during the second downward movement of the finger release, the bulb lever is freed for rocking movement in a clockwise direction by downward movement of the lug 62, but since the arm 54 of the time lever is then engaging and opposing the stop piece of the master lever, as shown in Figure 6, the arm 53 of the bulb lever cannot, by reason of its slightly longer length, be again raised and thus is ineffective during the second or shutter closing stroke of the finger release.

On the cam 60 is a second cam 68, the two cams being rigidly connected and simultaneously controlled by the dial 14 and forming in effect a single cam member. The cam 68 controls, through certain levers, the effective interposition of the retarding gear train, generally indicated at 69, mounted on the rear surface of the supporting plate 22 at the opposite side of the shutter frame 26, with respect to the cam 68 and including a terminal gear member having an upstanding lug 70. Against this lug is engaged one end of a retarding lever 71, intermediately pivoted upon a pivot screw 72 and controlled by a spring 73. The opposite end of this lever has a slotted head 74 and through its slot is extended a pin 75 of a lever 76 pivoted on a pivot screw 77 adjacent to the cam member, lever 76 having an upstanding lug 78 which is engaged by the peripheral edge of cam 68, so that, by the selective positioning of the cam 68, the positions of the two levers 71 and 76 are controlled. On lever 76 a master lever controlling arm 79 is pivoted at 80, the said pivot being at the lower end of the arm and the latter being curved around the pivot screw 77 and normally held by its spring 81 against a lug 82 of lever 76. In this way it is provided that arm 79 may swing in a counterclockwise direction with respect to the lever 76, while it is prevented from such relative swinging movement in a clockwise direction, and any movement thereof in a clockwise direction is necessarily communicated through the levers 76 and 71 and subjected more or less to the retarding action of the retarding gear train 69. The free end of the swinging arm 79 is angularly bent to form an abutment at 83 which is interposed in the path of swinging movement of the depending nose 51 of the master lever, and the speed of action of the shutter in opening and closing through the operation of the master lever is thus controlled to an extent which may be graduated by the extent to which the stop 83 opposes the stroke of the master lever.

By turning the dial 14, and through this dial the cam 68, the levers 76 and 71 are shifted, and in the shifting of these cams the stop 83 is interposed more or less in the path of swinging movement of the master lever nose 51 and, at the highest speed of movement, may be shifted out of the path of swinging movement of the master lever nose 51. When it is adjusted more or less into the path of the swinging movement of the master lever nose 51, it is obvious that, in the setting or clockwise swinging movement of the master lever 37 under manual control, the arm 71 may swing independently upon its pivot 80 with respect to lever 76 in order to permit upward movement of the master lever nose 51 past said arm. Since, however, it cannot swing independently of lever 76 in the opposite direction, it opposes a portion of the down swing of the master lever upon operation of the finger release 47, and thus during the latter portion of the stroke of the master lever, wherein the shutter is closed as before described, the movement of the master lever is, through arm 79 and levers 76 and 71, under the control of the retarding action of the gear train 69. In no position of the parts, however, does the master lever nose 51 come into engagement with the abutment 83 of the arm 69 until after the master lever shutter actuating arm 41 has first engaged and operated the shutter actuating lever 31 in the manner previously described to open the shutter, so that the full range of the retarding action is thus effective during only the latter or shutter closing portion of the operative stroke of the master lever.

It is believed to be obvious from the foregoing that the construction and arrangement of parts as thus fully described are such as to fully accord with the objects of the invention first above stated and to clearly show that the present mechanism is not only strong and durable, but is easily accessible and particularly adapted to cameras, presenting but limited space from front to rear for the reception of the shutter and its actuating mechanism between the camera case and its front or face plate upon which the shutter and its operating mechanism are disposed.

It will be understood, of course, and may be seen from Figure 1 that the finger release 47 is in practice of a length adapting its free end to project slightly beyond one side of the front plate 10 of the camera, for its convenient manipulation in use.

What is claimed is:

1. In a shutter actuating mechanism, a shutter actuating lever pivoted intermediate its ends and swingable in relatively opposite directions to open and close a shutter, a vertically swinging master lever pivoted beyond one side of the actuating lever, means for shifting the master lever manually in an upward direction to set position, a finger release for engaging and latching the master lever in its set position, spring means for moving the master lever in a downward direction upon actuation of said finger release, a pivoted arm carried by the master lever for engagement with and movement past a portion of the shutter actuating lever upon one side of the pivot of the latter during the initial portion of the spring actuated downward movement of the master lever to open the shutter, and a second and longer arm carried by the master lever for engagement with the shutter actuating lever at the opposite side of the pivot of the latter during the latter portion of the spring actuated stroke of the master lever for closing the shutter and holding the same closed by the force of the master lever spring and the weight of the master lever.

2. A shutter, an intermediately pivoted lever having operative connection at one end with the shutter to open and close the latter upon swinging movement of the lever in opposite directions, a pivoted swinging master lever, means for manually swinging the master lever in one direction to set position, a finger release having means for latching the master lever in set position, spring means for swinging the master lever in the opposite direction upon disengagement of said finger release, means carried by the master lever and operative during its spring actuated stroke for successively shifting the shutter actuating lever in relatively opposite directions, said master lever having a rigid stop member and an extension also rigid therewith, bulb and time levers cooperating with the finger release and having stop arms shiftable into and out of the path of movement of the said stop member, a retarding mechanism including a member shiftable into and out of the path of movement of said master lever extension, means forming a single cam member simultaneously controlling the effective positions of said bulb and time levers and the said shiftable member of the retarding means, and a dial in operative connection with the said cam member for controlling the effective position of the latter.

3. A shutter mechanism including a supporting plate, a shutter mounted on one side of said supporting plate, a shutter operating means mounted on the plate adjacent to said shutter including an intermediately pivoted shutter actuating lever in operative connection at one end of the shutter for opening and closing the shutter upon movement of said lever in relatively opposite directions, a master lever pivoted on the supporting plate, means extending from said master lever through the plate for manually shifting the master lever in one direction to set position, a finger release pivoted on the plate having means for latching the master lever in set position and having a free end projecting beyond one side of the plate, spring means engaging the master lever for shifting the same in the opposite direction upon disengagement of said finger release, means carried by the master lever and operable during its spring actuated movement for successively engaging portions of the actuating lever upon opposite sides of its pivot to swing the latter in relatively opposite directions, said master lever having a depending portion provided with a rigid stop piece and a rigid extension, bulb and time levers pivoted on the supporting plate, having portions cooperating with the finger release and having stop arms shiftable into and out of the path of swinging movement of said stop piece, a retarding mechanism including a member shiftable into and out of the path of swinging movement of the master lever extension, a pair of cams in rigid connection forming a single cam member simultaneously controlling the effective positioning of said bulb and time levers and the said shiftable member of the retarding mechanism, a shaft mounted through the supporting plate and upon one end of which said cams are rigid, and a dial member detachable in connection with the opposite end of said shaft upon the relatively opposite side of the supporting plate with respect to said cams.

4. A shutter actuating mechanism including a shutter actuating lever, a spring actuated master lever having means operable during movement thereof in one direction for successively moving said shutter actuating lever in relatively opposite directions corresponding to shutter opening and closing movements, a finger release for the master lever having means to normally prevent its spring actuated movement, a stop member and an extension carried by the master lever, bulb and time levers cooperating with the finger release and having portions thereof shiftable into and out of the path of movement of said stop member, a retarding mechanism including a member shiftable into and out of the path of movement of said master lever extension, a supporting plate upon which the mechanism is mounted, a shaft journalled through said plate, and means secured upon said shaft and forming a single cam member having peripheral portions controlling the effective positions of the bulb and time levers and the said shiftable member of the retarding means, whereby the said bulb and time levers and shiftable retarding member may be simultaneously regulated.

THEODORE M. BRUECK.